Figure 1:
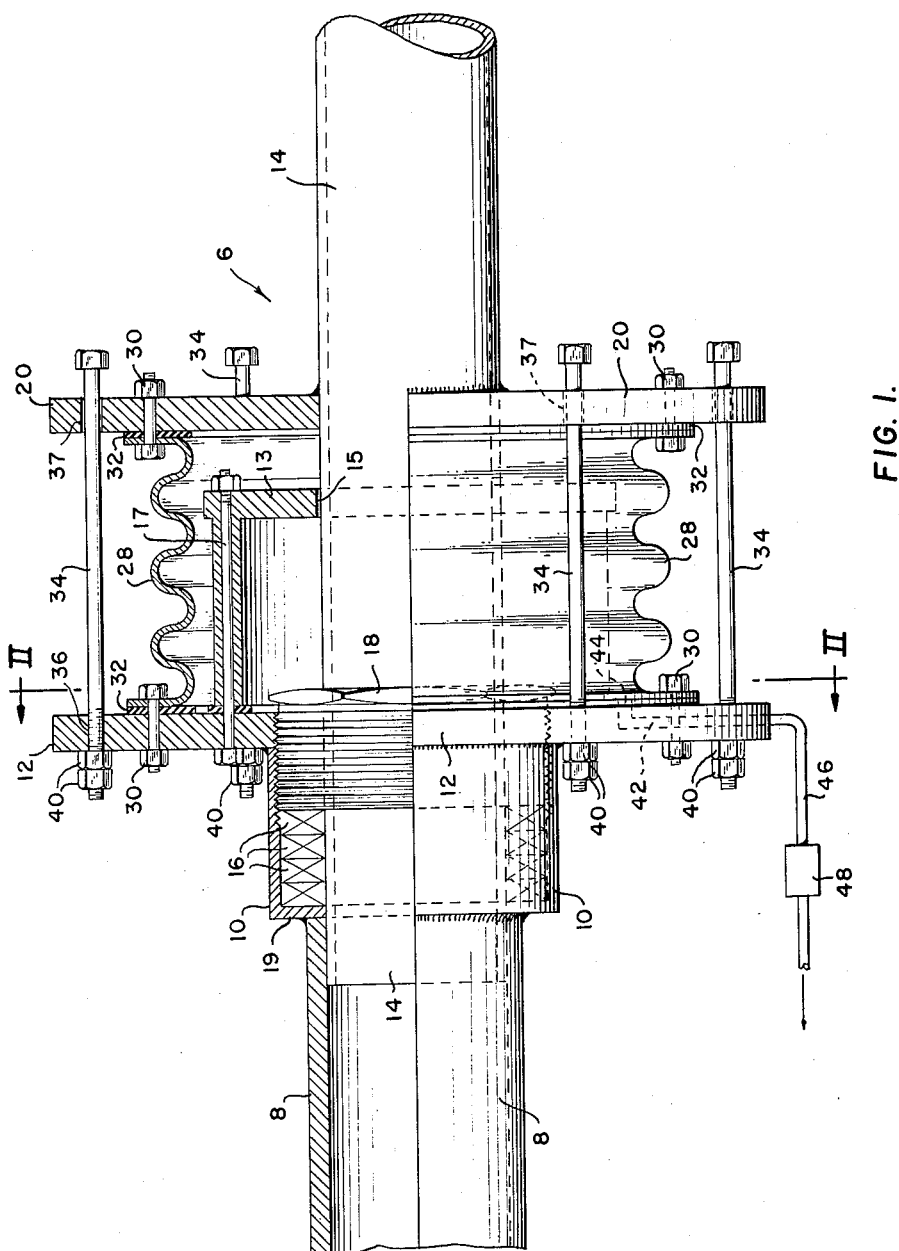

Sept. 26, 1961 W. T. DOWNING 3,001,801
EXPANSION JOINT WITH BELLOWS SEAL AND LEAKAGE DISPOSAL
Filed June 26, 1958 2 Sheets-Sheet 1

INVENTOR.
WILLIS T. DOWNING
BY
B. L. Zangwell
ATTORNEYS.

INVENTOR.
WILLIS T. DOWNING

BY

ATTORNEYS.

3,001,801
EXPANSION JOINT WITH BELLOWS SEAL AND LEAKAGE DISPOSAL
Willis T. Downing, 307 Beverly Drive, Alexandria, Va.
Filed June 26, 1958, Ser. No. 744,882
3 Claims. (Cl. 285—13)
(Granted under Title 35, U.S. Code (1952), sec. 266)

The invention described herein may be manufactured and used by or for the Government of the United States of America for governmental purposes without the payment of any royalties thereon or therefor.

This invention relates to a pipe joint, and more particularly to an expansion joint.

In constructional engineering, provision has to be made for the dimensional changes occurring in piping due to temperature variations in the fluid flowing in said piping. A prior art approach to the problem has been the construction commonly known as a bellows joint. Such a construction usually consists of one pipe telescoped within another and having a bellows member encompassing both pipes and fixedly connected to both at its opposite ends. Said bellows is usually in the form of a cylinder that encircles and encloses the point where one pipe enters the other, said bellows being adapted to take up sliding motion of one pipe relative to the other due to the expansion thereof by virtue of temperature differentials in the fluid flowing therethrough. The use of a mere bellows joint as an expansion absorbing member has certain disadvantages, the major of which is that the structure offers little resistance to pressure build-ups within the bellows; pressure build-ups occur due to leakage around the interconnected pipe members. In time, the pressure within the bellows chamber increases to such a point that the bellows explodes. It is pointed out that the bellows seldom merely cracks inasmuch as it is usually made of an austenitic steel in order that it may have high temperature tensile strength. However, such austenitic steels have relatively low fatigue strength at high temperatures, and the failure of such bellows is usually a fatigue failure brought about by continual flexing of the same due to repeated expansion and contraction of the pipe members to which it is connected. It is pointed out that in fatigue failure of austenetic steels, when exposed to excessive internal pressure as in the case of a bellows, they do not merely crack, but rather tend to explode throwing pieces of metal about, thereby endangering personnel in the surrounding area. Thus the conventional bellows alone, will not withstand the fatigue stresses to which it is normally subjected and it will in turn blow out. Another approach that has not been found satisfactory is the use of mere packing glands surrounding the smaller diameter pipe at the point where it enters the larger diameter one, inasmuch as such packing glands eventually wear out and allow steam and other fluids under pressure to escape thereby endangering personnel in the area.

It is an object of this invention to overcome the prior art disadvantages cited above.

It is another object of this invention to provide a pipe expansion joint for use with piping carrying fluids of varying temperature.

It is a further object of this invention to provide a pipe expansion joint, including a bellows means, wherein said bellows is not subjected to full line pressure and temperature.

It is still another object of this invention to provide a pipe expansion joint, including a bellows means, having means to provide for relieving pressure build-ups and fluid accumulations within said bellows.

Still another object of the invention is to provide a pipe expansion joint including a bellows means, wherein the bellows is not subject to fatigue failure due to flexing thereof.

An added object of the invention is to provide a pipe expansion joint, including a bellows means surrounding said joint, wherein said bellows is never subjected to full pipe line pressure in the event of a pipe line leak within said bellows.

Figure 2:
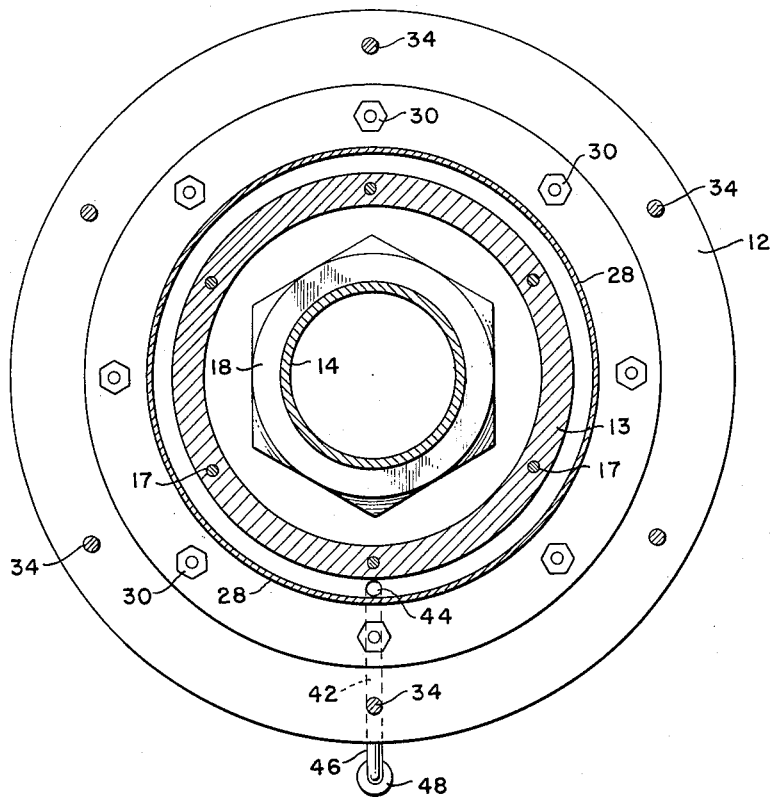

Other objects of the invention and many attendant advantages thereof will be apparent from the following description considered in conjunction with the accompanying drawings wherein:

FIG. 1 is an elevational view, partially in section, and partially broken away, of the expansion joint produced in accordance with this invention; and FIG. 2 is a transverse sectional view taken on line II—II of FIG. 1.

Referring to the drawings when like reference characters designate like or corresponding parts throughout the seveal views, there is shown in FIG. 1 a pipe expansion joint 6. The expansion joint 6 includes a female pipe member 8 having an enlarged packing gland housing 10 fixedly attached thereto in water and gas tight relation therewith, by welding or the like. It is pointed out that the pipe 8 can be so constructed that the gland housing 10 is formed integrally therewith. The housing 10 has an enlarged annular coupling flange 12 affixed to the free end thereof by welding or the like.

The joint 6 further includes a male pipe member 14 extending into the pipe 8 through the housing 10, said pipe 14 being surrounded by a plurality of packing glands 16 located within said housing 10. The hole in flange 12 and the adjacent interior of the packing gland housing 10 are internally threaded, so that both the flange 12 and the housing 10 are adapted to receive a threaded packing nut 18. The packing nut 18 is adapted to be screwed into the housing 10, into intimate contact with the packing glands 16 thereby compressing the same between the closed end 19 of the housing 10 and said nut thereby producing a lateral expansion thereof and a substantially moisture and gas tight seal between the pipes 8 and 14, yet at the same time allowing said pipes to slide relative to one another due to temperature differentials between them, and yet provide a coupling means that is particularly adapted to withstand high pipe line pressures.

The flange 12 on pipe 8 has removably attached thereto a pipe guide 13 of substantially cylindrical shape having an opening 15 at one end thereof through which the pipe 14 passes. The pipe guide 13 is held in abutting relation with the outer surface of the flange 12 by a plurality of bolts 17 extending longitudinally therethrough and through said flange. A circular gasket is interposed between the pipe guide 13 and the flange 12.

The pipe 14 is provided with a coupling flange 20 attached to the free end thereof at a substantial distance from the free end by welding or the like.

A bellows member 28 of substantially cylindrical form, and open at both ends, is interposed between the flanges 12 and 20 and is bolted to both by a plurality of bolts 30 extending through a flange portion at the respective ends of the bellows, and through the respective flanges 12 and 20. An annular gasket 32 is interposed between the ends of the bellows and the adjacent flanges 12 and 20 respectively, for purposes of maintaining a moisture and gas tight seal between said bellows and the respective flanges. It is pointed out that the structure, as shown in FIG. 1 is with the bellows in unextended condition.

In order to prevent excesisve expansion of the bellows 28, a plurality of bolts 34 are used to interconnect said flanges. The flanges 12 and 20 are provided with a plurality of alignable bolt receiving holes 36 and 37 respectively, extending around the periphery thereof. The holes 36 are threaded to receive a threaded end portion of each bolt 34, while the holes 37 are larger than said bolts whereby the latter may move relative to the flange 20. Each of the bolts 34 is provided with a threaded end portion extending beyond flange 12 and having a pair of nut members 40 threaded thereon, said nut members 40 being in abuting relation with one another whereby they are locked relative to said bolt and removal thereof by vibration and the like is essentially prevented.

It is pointed out that the bolts 34 are longer than the distance between the flanges 12 and 20 whereby each bolt is movable relative to the flange 20. Thus the head on each bolt is not in abutment with the outer surface of the flange 20 under normal conditions, thereby allowing relative movement of the pipes 8 and 14 due to expansion thereof during changes in temperature. The expansion is taken up by the bellows member 28. However, the bolts 34 are so dimensioned as to form a bellows expansion arresting means, when said bellows has expanded longitudnally beyond a certain limit, as will be apparent upon an examination of FIG. 1.

It is conceded that, in spite of the best intentions of the aforementioned structure, there may be situations arising where leakage will occur between the telescoped pipes 8 and 14, which will of course allow moisture and/or gases to escape from the pipes into the interior of the bellows member 28, thereby allowing a pressure build-up and/or an accumulation of moisture within said bellows. In order to relieve such a pressure and/or moisture build-up within the bellows, an air and fluid moisture drain passageway 42 is provided in the flange 12, in the embodiment shown in FIG. 1; the passageway 42 opens into the interior of the bellows housing through a hole 44 extending through the face of the flange 12 that is within the bellows 28, as shown in FIGS. 1 and 2. The drain passageway 42 has at its exit end, drain pipe 46 connected thereto and having, if desired, a drainage trap 48 associated therewith. Thus moisture and/or gas within the bellows is allowed to escape to the atmosphere, thereby relieving pressure buildups within the bellows 28 and insuring that the bellows is never subjected to full line pressure. This feature also prevents an undue amount of flexing of the bellows 28 due to the fact that the pressure within the same is relieved before it can build up to any extent. Accordingly, bellows 28 is subjected to longitudnal flexing only due to relative expansion movements between the pipes 8 and 14.

It is emphasized that by virtue of the applicant's invention, as described above, a pipe expansion joint is provided utilizing a bellows member wherein the bellows member is never subjected to excessive radial pressure, and/or excessive temperatures due to escaping fluids from a pipe line. It is pointed out that the high pressure resistance of the instant system is provided by the packing gland arrangement 10, 16 and 18. The packing gland arrangement adapted to resist excessively high pressures or temperatures, whereas the bellows arrangement is only required to compensate for longitudnal expansion between the pipe members 8 and 14 preventing excessive movement of either and guiding such movement. Thus the instant invention combines the best features of the pressure and temperature resistant qualities of the packing gland arrangement including elements 10, 16 and 18, and the expansion joint attributes of the bellows member 28, without subjecting said bellows member to excessive pressure and temperatures, as has heretofore been the case.

What is claimed is:

1. An expansion pipe joint comprising, a first pipe member, a bell portion, said bell portion being secured in gas tight relationship to the end of said first pipe member and forming an integral part of said first pipe member, a second pipe member having an end portion telescopically mounted within an end portion of said first pipe member and the remainder thereof being located externally of said bell portion, a packing gland within said first pipe member bell portion and surrounding said second pipe member, said second pipe member extending axially inwardly into said first pipe beyond said bell portion, an externally threaded nut rotatably mounted on said second pipe member and threadedly engaged within said bell portion in adjustable, abutting relation with said packing gland, whereby said packing gland may be tightened against the interior of said bell portion and the exterior of said second pipe member so as to be maintained in moisture and gas tight relationship; a first coupling flange fixedly connected to the bell portion on the end portion most remote from the end of said first pipe member, a second coupling flange fixedly connected to said second pipe member and spaced from the first coupling flange, means attached to the flange on said first pipe member radially outward of said attachment of said flange to said bell portion and extending between said flanges, said latter means having radially inwardly extending means secured thereto embracing and slidably supporting said second pipe member against lateral movement relative to said first pipe member, a gasket, said gasket being placed between said flange on said bell portion and said latter means; a cylindrical austenitic bellows extending between the spaced juxtaposed faces of said coupling flanges and fixedly connected to said faces in moisture and gas tight relation with both, a second and third gasket, said second and third gaskets being placed between the end portion of said bellows and said first and second flanges respectively thereby forming said moisture and gas tight relationship, and a passageway formed in one of said flanges having one end thereof in communication with the interior of said bellows and extending laterally through said flange to the exterior of said bellows, whereby accumulations of moisture and/or gas within said bellows may escape therefrom.

2. An expansion pipe joint as set forth in claim 1 further including, an inelastic stop means extending between said flanges and attached thereto for preventing excessive separation between said flanges.

3. An expansion joint as set forth in claim 2 wherein, said stop means comprises a plurality of headed bolts extending between said flanges and connected therewith, the connection between said bolts and at least one of said flanges being a slidable one.

References Cited in the file of this patent

UNITED STATES PATENTS

| 713,113 | Kraemer | Nov. 11, 1902 |
| 1,318,525 | Baldwin | Oct. 14, 1919 |
| 1,505,121 | Allport | Aug. 19, 1924 |
| 2,445,484 | Kopperman | July 20, 1948 |
| 2,709,606 | Mueller et al. | May 31, 1955 |
| 2,787,127 | Benz | Apr. 2, 1957 |
| 2,841,419 | Jay | July 1, 1958 |

FOREIGN PATENTS

| 160,280 | Austria | Apr. 3, 1938 |
| 667,144 | Germany | Nov. 5, 1938 |